United States Patent
Wu et al.

(10) Patent No.: US 10,019,073 B2
(45) Date of Patent: Jul. 10, 2018

(54) KEYBOARD DEVICE

(71) Applicant: PRIMAX ELECTRONICS LTD., Taipei (TW)

(72) Inventors: Tung-Heng Wu, Taipei (TW); Ying-Che Tseng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 151 days.

(21) Appl. No.: 15/331,516

(22) Filed: Oct. 21, 2016

(65) Prior Publication Data

US 2018/0046260 A1    Feb. 15, 2018

(30) Foreign Application Priority Data

Aug. 12, 2016  (TW) .............. 105125758 A

(51) Int. Cl.
*G06F 21/31* (2013.01)
*G06F 3/02* (2006.01)
*G06F 3/041* (2006.01)
*G06K 19/06* (2006.01)
*G06K 7/14* (2006.01)
*G06Q 20/32* (2012.01)

(52) U.S. Cl.
CPC ............ *G06F 3/021* (2013.01); *G06F 3/0227* (2013.01); *G06F 3/0416* (2013.01); *G06F 21/31* (2013.01); *G06K 7/1417* (2013.01); *G06K 19/06037* (2013.01); *G06Q 20/3274* (2013.01)

(58) Field of Classification Search
CPC ........ G06F 21/31; G06F 3/021; G06F 3/0227; G06F 3/0416; G06K 19/06037; G06K 7/1417; G06Q 20/3274
See application file for complete search history.

(56) References Cited

U.S. PATENT DOCUMENTS

| | | | | |
|---|---|---|---|---|
| 2002/0117549 A1* | 8/2002 | Lee | ...................... | G06F 3/03543 235/462.45 |
| 2011/0006991 A1* | 1/2011 | Elias | ...................... | G06F 1/1662 345/168 |
| 2014/0104173 A1* | 4/2014 | Bruno | ................... | G06F 3/0202 345/168 |
| 2015/0049023 A1* | 2/2015 | Wu | ......................... | G06F 3/023 345/168 |

\* cited by examiner

*Primary Examiner* — Hong Zhou
(74) *Attorney, Agent, or Firm* — Kirton McConkie; Evan R. Witt

(57) ABSTRACT

A keyboard device includes plural keys, an image pickup device, and a processor. The processor is connected with the image pickup device. The image pickup device is used for capturing an operation image of the plural keys that are operated. Moreover, after an information image over the keyboard device is scanned by the image pickup device, a scanned image is obtained. According to the received operation image, the processor generates a corresponding operation signal to a touch device. Moreover, according to the scanned image, the processor generates a corresponding information signal to the touch device.

14 Claims, 4 Drawing Sheets

KEYBOARD DEVICE

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices.

With increasing development of science and technology, tablet computers have experienced great growth and are now rapidly gaining in popularity. The tablet personal computer has slim and small-sized appearance similar to a LCD screen. In addition, the display screen of the tablet computer is a touch screen. Via the touch screen, the user may input commands to the tablet computer in order to control operations of the tablet computer. In case that the user wants to input characters or symbols into the tablet computer, an on-screen keyboard is enabled and shown on the touch screen of the tablet computer. The on-screen keyboard is a virtual keyboard simulating the real keyboard device. By touching icons of the on-screen keyboard, corresponding characters or symbols are inputted into the tablet computer.

Since the tablet computer has a small-sized shape and does not need to be connected with an external keyboard device, the tablet computer is easily carried. However, there are still some drawbacks. For example, the use of the touch screen to input characters or symbols becomes hindrance for most users who are familiar with the common personal computers or notebook computers. For example, with the popularity of electronic commerce, people like to operate the tablet computer to do the online shopping. After the shopping is ended and during the process of paying money through a payment platform, the user has to input a long list of personal information to the payment platform for authentication. The personal information includes for example the credit card information, the contact information, the shipping address information, etc. After the personal information is authenticated, the debit program is completed. That is, the use of the touch screen to input the personal information is troublesome and inconvenient. Generally, the movable distance of depressing a physical key of the general keyboard device is referred as a travelling distance. While the icon of the on-screen keyboard of the touch screen is touched, the travelling distance of the physical key cannot be generated. That is, the touching action on the icon of touch screen cannot provide the feedback force to the user. Under this circumstance, the tactile feel of operating the touch screen is deteriorated, and thus an erroneous inputting problem occurs.

In other words, the way of using the conventional touch device needs to be further improved.

SUMMARY OF THE INVENTION

An object of the present invention provides a keyboard device with an image pickup device. The tactile feel of operating the keyboard device is enhanced. According to an operation image or a scanned image captured by the image pickup device, a corresponding input action is generated. Consequently, the user can operate the touch device more easily.

In accordance with an aspect of the present invention, there is provided a keyboard device. The keyboard device includes a casing, plural keys, at least one image pickup device, and a processor. Each of the plural keys is at least partially exposed outside the casing so as to be depressed. The at least one image pickup device is installed in the casing. After an operation image of the plural keys that are operated is captured by the at least one image pickup device, an information image over the keyboard device is scanned by the at least one image pickup device. Consequently, a scanned image is acquired. The processor is connected with the at least one image pickup device to receive the operation image and the scanned image. When the processor judges that at least one of the plural keys is depressed according to the operation image, the processor generates a corresponding operation signal to a touch device. Moreover, the processor generates a corresponding information signal to the touch device according to the scanned image.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
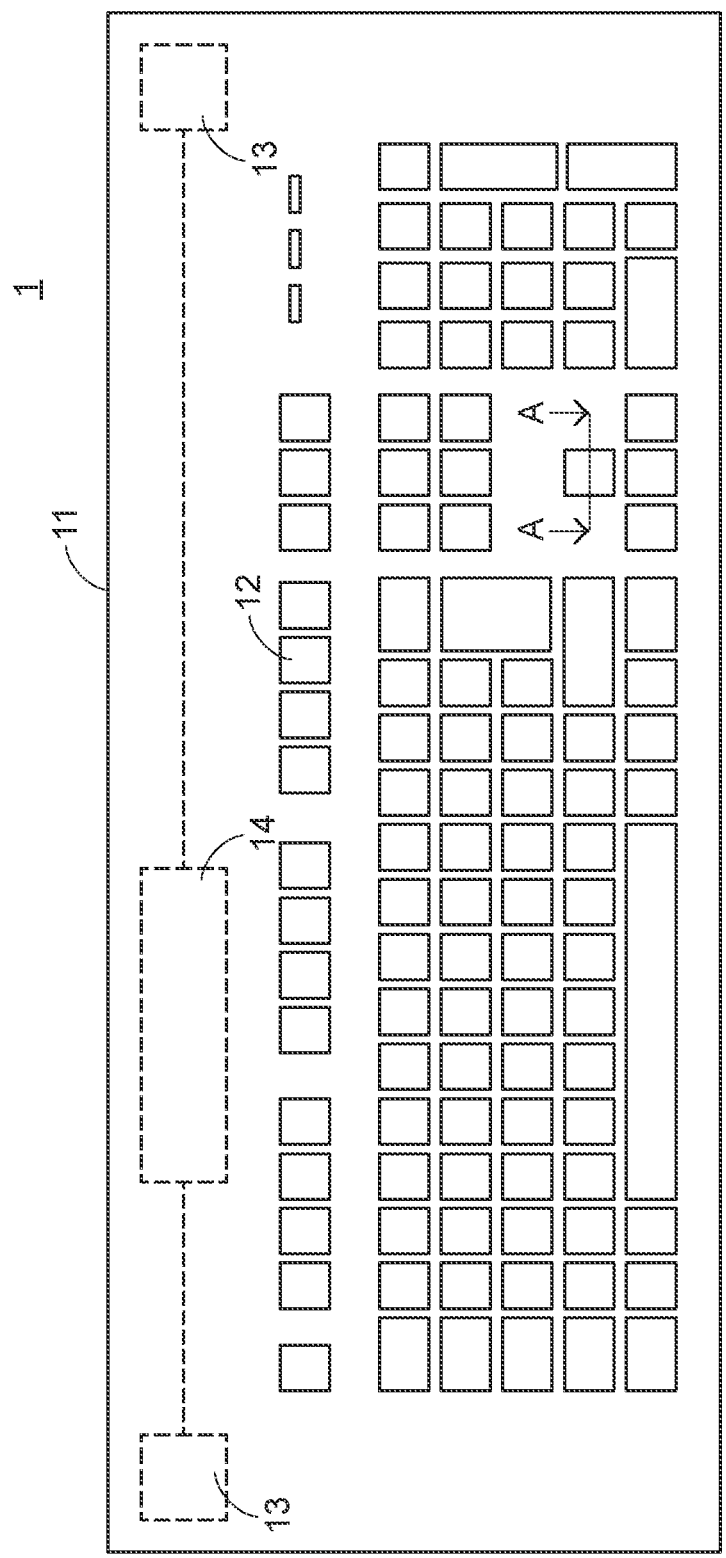
FIG. 1 is a schematic top view illustrating the outer appearance of a keyboard device according to an embodiment of the present invention.
Figure 2:
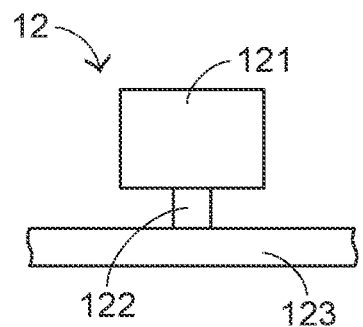
FIG. 2 is a schematic cross-sectional view illustrating a portion of the keyboard device of FIG. 1 and taken along the line A-A.
Figure 3:
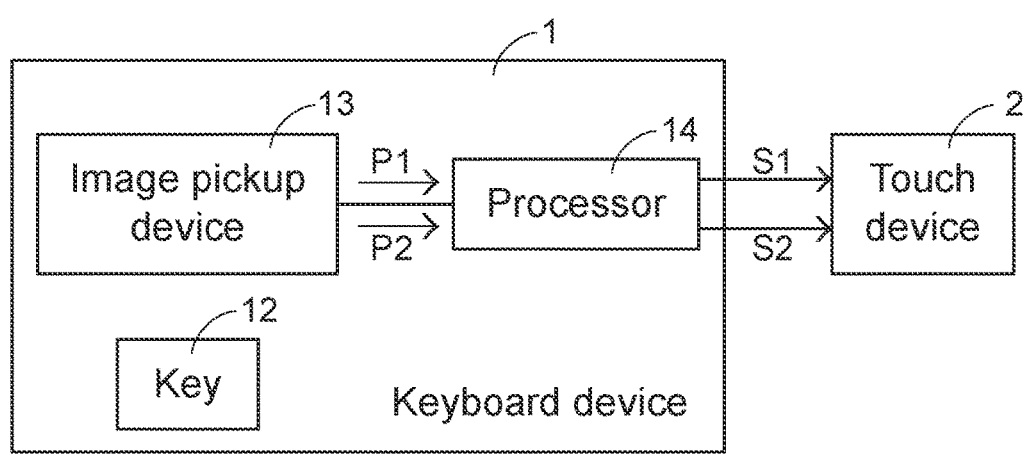
FIG. 3 is a schematic functional block diagram illustrating the relationship between a touch device and the keyboard device of FIG. 1.

Please refer to FIGS. 1, 2 and 3. FIG. 1 is a schematic top view illustrating the outer appearance of a keyboard device according to an embodiment of the present invention. FIG. 2 is a schematic cross-sectional view illustrating a portion of the keyboard device of FIG. 1 and taken along the line A-A. FIG. 3 is a schematic functional block diagram illustrating the relationship between a touch device and the keyboard device of FIG. 1. The keyboard device 1 is in communication with a touch device 2. For example, the touch device 2 is a tablet computer. Moreover, the keyboard device 1 is in communication with a touch device 2 by a wired connection technology or a wireless connection technology. The wireless connection technology is for example a Bluetooth connection technology or a wifi connection technology. In this embodiment, the keyboard device 1 comprises a casing 11, plural keys 12, two image pickup devices 13 and a processor 14. The plural keys 12, the image pickup devices 13 and the processor 14 are supported by the casing 11. The processor 14 is connected with the image pickup devices 13 to receive the images that are captured by the image pickup devices 13. All of the plural keys are at least partially exposed outside the casing 11 so as to be depressed by the user. These keys 12 are classified into some types, e.g., ordinary keys, numeric keys and function keys (F1~F12). When one of these keys 12 is depressed, the touch device 2 executes a corresponding function.

Each of the image pickup devices 13 is used for capturing the images of the keys 12 that are operated by the user. The image of the plural keys 12 that are operated by the user is referred hereinafter as an operation image P1. The operation image P1 is transmitted from the image pickup device 13 to the processor 14. After the operation image P1 is received by the processor 14, the processor 14 judges the depressed key 12 and generates a corresponding operation signal S1 to the touch device 2. According to the operation signal S1, the touch device 2 executes a corresponding command. For example, if the processor 14 judges that the depressed key 12 is an ordinary key according to the received operation image P1, the touch device 2 executes the command of inputting a corresponding English letter or symbol. If the processor 14 judges that the depressed key 12 is a numeric key according to the received operation image P1, the touch device 2 executes the command of inputting a corresponding number. If the processor 14 judges that the depressed key 12 is a function key according to the received operation image P1, the touch device 2 executes the command of providing a quick access function.

Moreover, after an information image over the keyboard device 1 is captured by the image pickup device 13, a scanned image P2 is obtained and transmitted to the processor 14. After the scanned image P2 is received by the processor 14, a corresponding information signal S2 is outputted to the touch device 2 according to the contents of the scanned image P2. The touch device 2 is operated according to the information signal S2. For example, the operations of an online shopping scenario in response to the information signal S2 will be described later.

In this embodiment, each of the plural keys 12 comprises a keycap 121, an elastic element 122 and a plate body 123. The elastic element 122 is arranged between the keycap 121 and the plate body 123. For example, the elastic element 122 is a spring or a rubbery element. While the key 12 is depressed, the elastic element 122 is compressed to generate an elastic force to the keycap 121. When the key 12 is no longer depressed, the keycap 121 is restored to its original position in response to the elastic force of the elastic element 122. Consequently, the tactile feel of operating the key 12 is enhanced.

In this embodiment, the two image pickup devices 13 are disposed within the casing 11 and located at two sides of the casing 11. Moreover, all of the plural keys 12 are transparent keys. Consequently, the image pickup devices 13 can acquire the operation images P1 of the keys 12 that are operated by the user and scan the information image over the keys 12. It is noted that the positions and the number of the image pickup devices 13 and the types of the keys 12 are not restricted.

Moreover, if the operation image P1 received by the processor 14 complies with an image condition, the processor 14 controls the keyboard device 1 to enter a function mode. In an embodiment, the image condition of the operation image P1 is satisfied when the processor 14 judges that the number of the depressed keys 12 is larger than a specified value. When the processor 14 judges that the image condition of the operation image P1 is satisfied, the processor 14 controls the keyboard device 1 to enter the function mode. In an embodiment, the function mode is a scanning mode.

When the keyboard device 1 is in the scanning mode, the processor 14 controls the image pickup devices 13 to capture the information image over the keyboard device 1.

The image condition and the setting of the function mode are not restricted. That is, the image condition and the setting of the function mode may be varied according to the practical requirements. For example, in another embodiment, the image condition of the operation image P1 is satisfied when the processor 14 judges that that a specified key of the plural keys 12 is depressed according to the received operation image P1. Then, the processor 14 controls the keyboard device 1 to enter the function mode.

Figure 4:
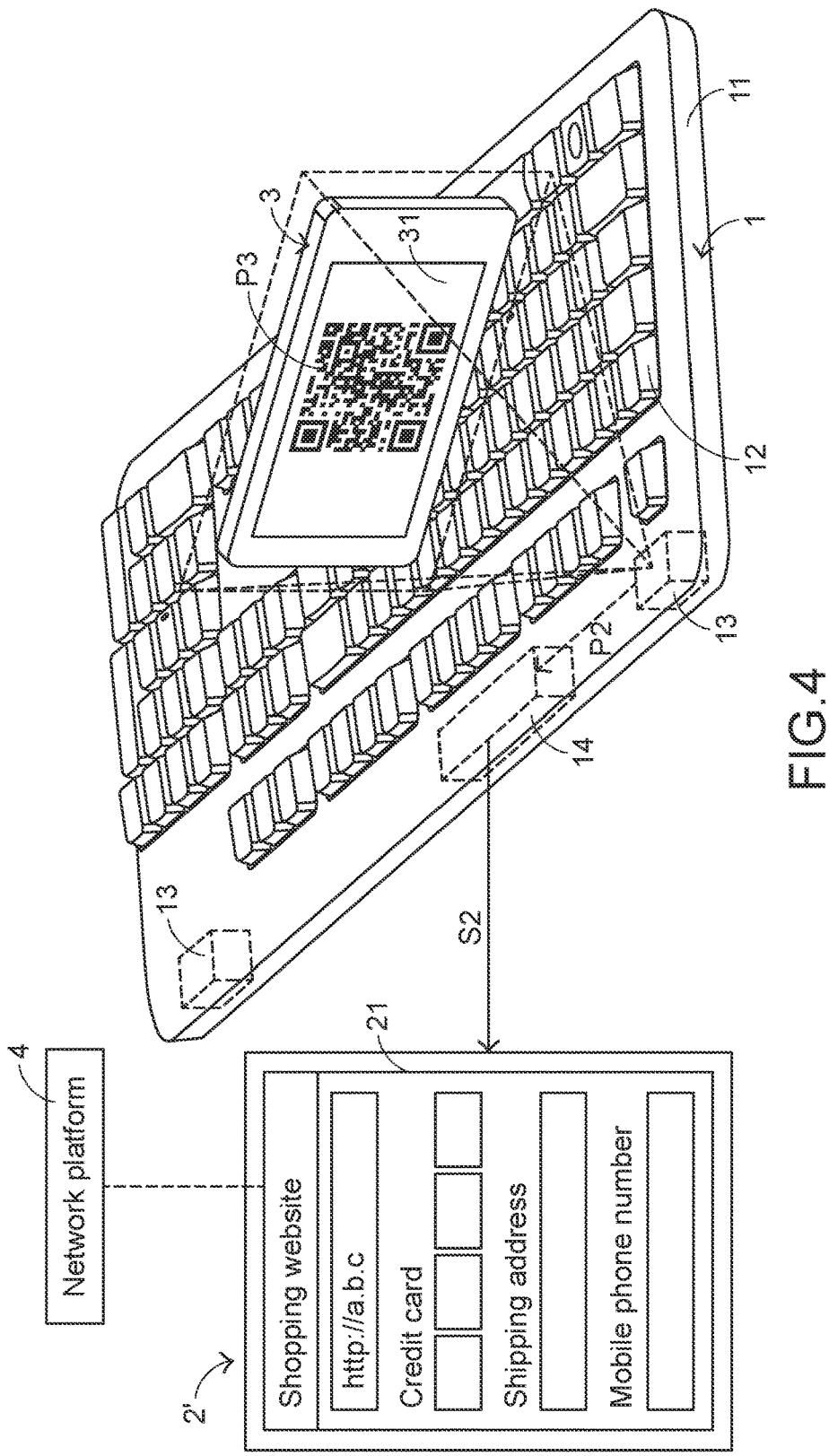
FIG. 4 schematically illustrates an implementation example of operating the keyboard device of FIG. 1 in an online shopping scenario.

The operations of using the keyboard device 1 of the present invention in the online shopping scenario will be illustrated as follows. The application of the keyboard device 1 in the online shopping scenario is presented herein for purpose of illustration and description only. FIG. 4 schematically illustrates an implementation example of operating the keyboard device of FIG. 1 in an online shopping scenario. In FIG. 4, a tablet computer 2', a mobile phone 3, a keyboard device 1 and a network platform 4 are shown. The network platform 4 has a payment service function. Moreover, the user information of the user is stored in the mobile phone 3. In an embodiment, the user information is an information image P3 shown on a display screen 31 of the mobile phone 31. An example of the information image P3 includes but is not limited to a barcode image or a QR code image.

As shown in FIG. 4, the user operates the keyboard device 1 to connect the tablet computer 2' with the network platform 4 through network connection in order to do the online shopping. After the online shopping is ended, a debit program begins. During the debit program, the user has to provide the requisite authentication information to the network platform 4. The authentication information is usually the user information of the user (e.g., the credit card information, the contact information, the shopping address information, etc.). Then, the mobile phone 3 is disposed over the keyboard device 1. After the user operates the keyboard device 1 to have the keyboard device 1 enter the scanning mode, the processor 14 controls the image pickup devices 13 to scan the information image over the keyboard device 1. Since the mobile phone 3 is disposed over the keyboard device 1, the information image P3 shown on a display screen 31 of the mobile phone 3 is scanned by the image pickup devices 13.

After the information image P3 is scanned by the image pickup devices 13, the scanned image P2 is obtained and transmitted to the processor 14. After the scanned image P2 is received by the processor 14, the corresponding information signal S2 is transmitted from the processor 14 to the tablet computer 2'. As mentioned above, the information image P3 contains the contents of the user information. In other words, the information signal S2 corresponding to the scanned image P2 of the information image P3 contains the required authentication information for the network platform 4. After the tablet computer 2' is authenticated by the network platform 4 according to the information signal S2, the debit program is completed.

In some embodiments, the network safety is strengthened. For example, if the debit program is not completed after the user information is acquired by the network platform 4, a returned information is transmitted from the network platform 4 to the user through the user information. Then, the authenticating process is repeatedly done through the tablet computer 2'. This is a double authenticating process.

Figure 5:
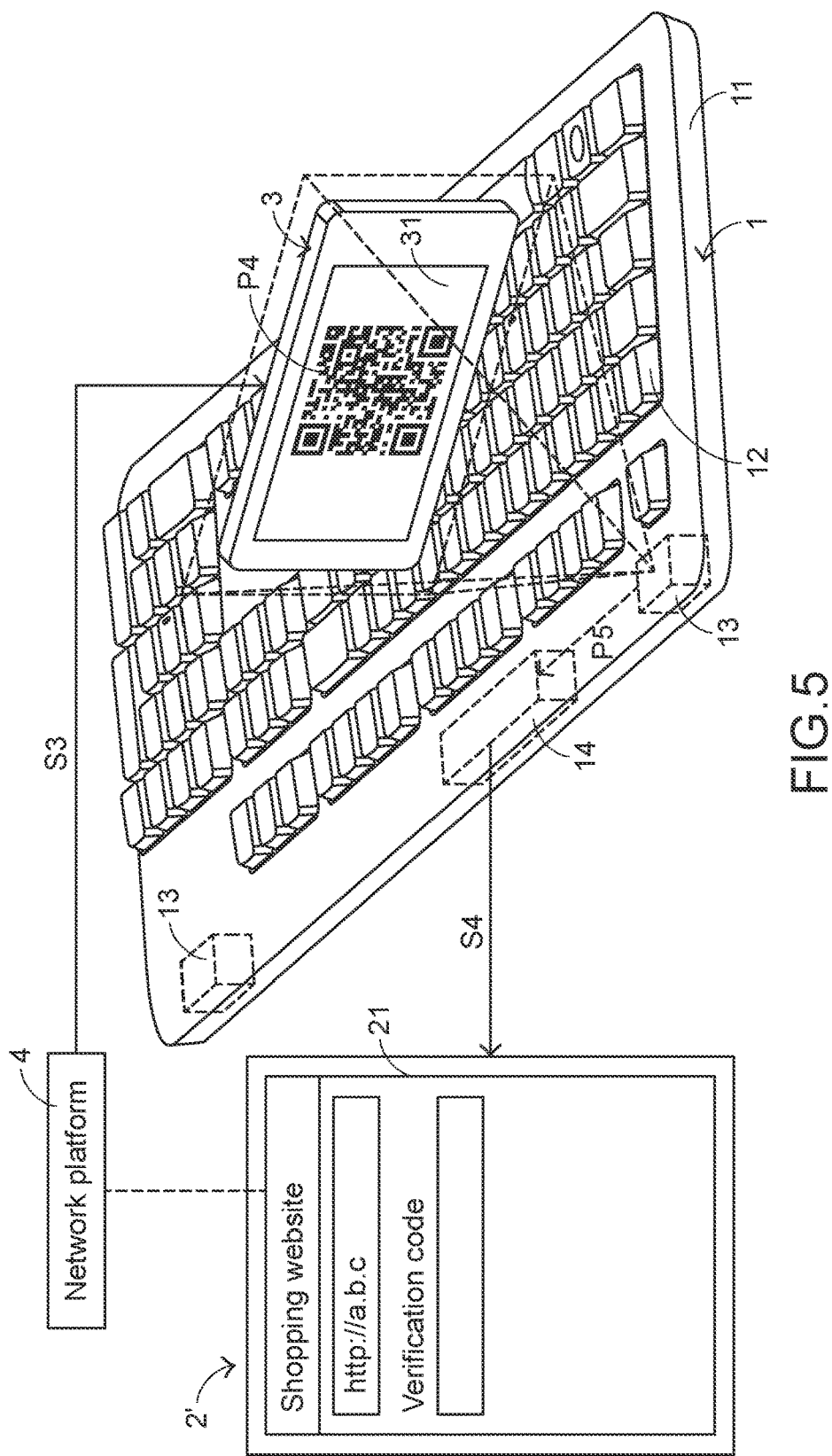
FIG. 5 schematically illustrates another implementation example of operating the keyboard device of FIG. 1 in an online shopping scenario.

FIG. 5 schematically illustrates another implementation example of operating the keyboard device of FIG. 1 in an online shopping scenario. According to the contact information of the user, a returned information S3 containing a verification code is transmitted from the network platform 4 to the mobile phone 3 of the user. After the returned information S3 from the network platform 4 is opened by the user through the mobile phone 3, an information image P4 corresponding to the returned information S3 is shown on the display screen 31 of the mobile phone 3. An example of the information image P4 includes but is not limited to a barcode image or a QR code image. After the mobile phone 3 is placed over the keyboard device 1 again, the information image P4 shown on the display screen 31 of the mobile phone 3 is scanned by the image pickup devices 13.

After the information image P4 is scanned by the image pickup devices 13, a scanned image P5 is obtained and transmitted to the processor 14. After the scanned image P5 is received by the processor 14, a corresponding information signal S4 is outputted to the touch device 2' according to the contents of the scanned image P5. As mentioned above, the information image P4 contains the contents of the returned information from the network platform 4. In other words, the information signal S4 corresponding to the scanned image P5 of the information image P4 contains the required authentication information with the verification code for the network platform 4. After the tablet computer 2' is authenticated by the network platform 4 according to the received information signal S4 again, the debit program is completed.

From the above descriptions, the present invention provides the keyboard device 1. When the user operates the tablet computer 2' to do the online shopping through network connection, it is not necessary to troublesomely and successively touch the touch screen 21 of the tablet computer 2' or depress the keys of the keyboard device 1 to input the authentication information into the tablet computer 2'. After the keyboard device 1 is switched to the scanning mode and the information image containing the authentication information is scanned by the keyboard device 1, the authentication process and the debit program are easily completed. Since it is not necessary to successively depress the keys 12 to input the authentication information into the tablet computer 2', the use of the keyboard device 1 can effectively solve the erroneous inputting problem.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
   a casing;
   plural keys, wherein each of the plural keys is at least partially exposed outside the casing so as to be depressed;
   at least one image pickup device installed in the casing, wherein after an operation image of the plural keys that are operated is captured by the at least one image pickup device, an information image over the keyboard device is scanned by the at least one image pickup device, so that a scanned image is acquired; and
   a processor connected with the at least one image pickup device to receive the operation image and the scanned image, wherein when the processor judges that at least one of the plural keys is depressed according to the operation image, the processor generates a corresponding operation signal to a touch device, wherein the processor generates a corresponding information signal to the touch device according to the scanned image.

2. The keyboard device according to claim 1, wherein the at least one image pickup device is disposed within the casing, and at least one of the plural keys is a transparent key.

3. The keyboard device according to claim 1, wherein the information image is shown on a portable electronic device.

4. The keyboard device according to claim 1, wherein the information image is a barcode image or a QR code image.

5. The keyboard device according to claim 1, wherein the information signal contains an authentication information, and the authentication information is provided to a network platform for authentication.

6. The keyboard device according to claim 5, wherein the authentication information contains a user information, or the authentication information contains a returned information from the network platform.

7. The keyboard device according to claim 5, wherein the network platform is a payment platform.

8. The keyboard device according to claim 1, wherein if the operation image received by the processor complies with an image condition, the processor controls the keyboard device to enter a function mode.

9. The keyboard device according to claim 8, wherein the function mode is a scanning mode, wherein when the keyboard device is in the scanning mode, the processor controls the at least one image pickup device to capture the information image over the keyboard device.

10. The keyboard device according to claim 8, wherein if the processor judges that a specified key of the plural keys is depressed according to the operation image, the operation image complies with the image condition.

11. The keyboard device according to claim 8, wherein if the processor judges that a number of the depressed keys is larger than a specified value according to the operation image, the operation image complies with the image condition.

12. The keyboard device according to claim 1, wherein at least one key of the plural keys comprises an elastic element, wherein when the at least one key is depressed, the elastic element provides an elastic force to the at least one key.

13. The keyboard device according to claim 1, wherein the keyboard device is in communication with a touch device by a wired connection technology or a wireless connection technology.

14. The keyboard device according to claim 1, wherein the touch device is a tablet computer.

* * * * *